April 22, 1969   T. J. PAPPALARDO   3,440,577
MICROWAVE SHUTTER
Filed Dec. 27, 1965
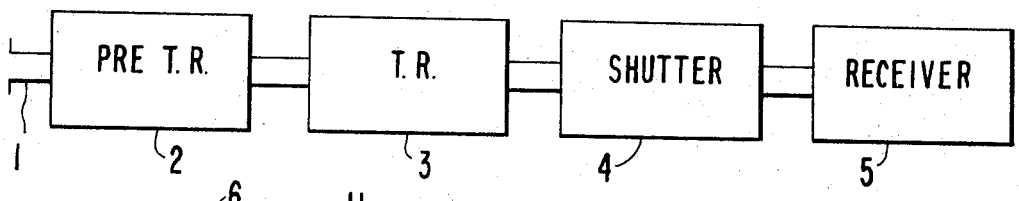
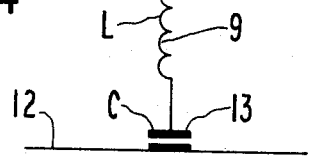
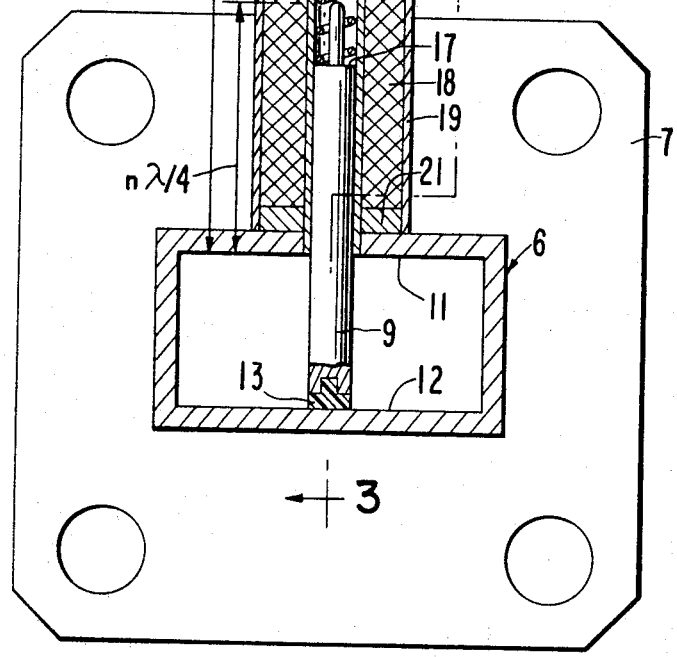
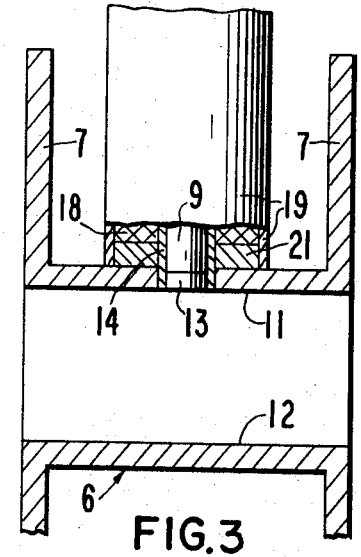
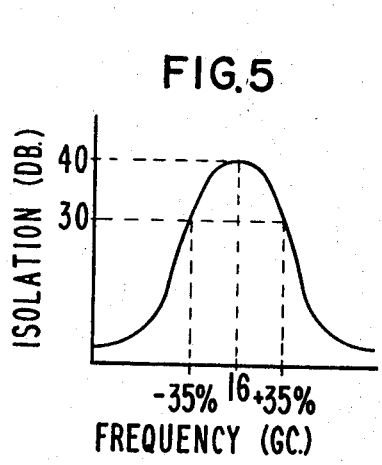
INVENTOR.
THOMAS J. PAPPALARDO
BY
*Harry E. Pine*
ATTORNEY

# United States Patent Office 3,440,577
Patented Apr. 22, 1969

3,440,577
MICROWAVE SHUTTER
Thomas J. Pappalardo, Bradford, Mass., assignor to Varian Associates, Palo Alto, Calif., a corporation of California
Filed Dec. 27, 1965, Ser. No. 516,605
Int. Cl. H01p 1/20
U.S. Cl. 333—98                           8 Claims

ABSTRACT OF THE DISCLOSURE

A microwave shutter apparatus is disclosed. The shutter includes a waveguide having first and second mutually opposed broad conductive walls. A conductive rod is insertable through one of the broad walls and across the waveguiding structure into electrically non-contacting relation with the opposed broad wall to form a capacitance between the non-contacting end of the rod and the adjacent broad wall. The rod is dimensioned to provide an inductance which is series resonated with the capacitance of the rod to the broad wall at a certain resonance frequency within the passband of the waveguide. When inserted into the waveguide, the rod forms a series resonant element in shunt across the waveguide for reflecting wave energy back along the waveguide which is incident upon the rod and which is within a certain passband of frequency centered at the resonant frequency of the rod. A solenoid is provided externally of the waveguide for selectively retracting and inserting the rod within the waveguide. When the rod is retracted out of the waveguide, the waveguide passes energy within the certain passband of frequencies.

---

Heretofore, the shutter device has taken the form of a shorting element which is caused to pass across the guide, shorting the top and bottom walls together by making electrical contact with both walls of the guide to reflect received wave energy back toward the receiving antenna. In this manner, the sensitive receiver elements are protected from high intensity radar signals transmitted by nearby radars and passed through the other protective devices such as the pre-TR and TR tubes. Without the shutter these high intensity signals would burn out the crystals in the microwave receiver. Such a shutter device need operate only at moderate power levels as of 30–50 watts and should provide preferably more than 20 db of isolation.

Typically, the shutter element has been incorporated into the TR tube which, typically, includes a pair of cone-shaped members projecting toward each other from the broad walls of the guide and defining a short discharge gap between their opposed points. The shutter element at 10 gc. and below was conveniently made axially translatable within the axially bored interior of one of the cone elements and, in the closed position, extended across the discharge gap to the opposed cone member for shorting the guide. However, at frequencies above X band the cone-shaped elements become physically too small to accommodate a reasonably sized axially translatable rod. Thus, for frequencies above X band, such as at 20 gc., it was typical to use a shorting rod which approached and shorted the cone member from the narrow side wall of the guide. However, this introduced a conductor into the guide and, although it extended into the guide normal to the electric field lines, it produced an open insertion loss because it could not be fully retracted during operation of the radar. Aside from the insertion loss, which caused an unwanted reduction in amplitude of the received signal, as seen by the receiver, the presence of the conductor in the guide during operation of the radar produced an unwanted phase modulation of the received signal due to microphonic action of the shutter rod under vibration encountered in use.

In the present invention, a non-electrically contacting resonant shutter element is employed which when closed passes from top to bottom of the guide and which is completely retractable from the guide to prevent microphonics in the open position. The shutter element comprises a shorting rod including a series capacitance portion to the opposed wall whereby variable contact resistance is avoided in the closed position under vibration. Because the shorting element is resonant, a very effective reflection of wave energy is obtained when the guide is shorted.

The principal object of the present invention is the provision of an improved waveguide shutter.

One feature of the present invention is the provision of an electrically non-contacting series resonant shorting element which shunts the guide from top to bottom wall in the closed position and which is fully retractable from the guide in the open position, whereby improved closed isolation is obtained without introducing open insertion loss.

Another efature of the present invention is the provision of a dielectric tip portion on the shorting element for increasing the series capacitance of the shorting element and for absorbing axial vibration and shock forces on the shorting element in the closed position.

Other features and advantages will become apparent upon a perusal of the following specification taken in connection with the accompanying drawings wherein:

FIG. 1 is a schematic block diagram of a radar receiver incorporating the shutter tube of the present invention, FIGURE 2 is an enlarged transverse sectional view of a microwave shutter incorporating the features of the present invention, FIGURE 3 is a longitudinal view of the structure of FIGURE 2 taken along line 3—3 in the direction of the arrows, but showing the shunting element in the retracted position, FIGURE 4 is a schematic equivalent circuit diagram of a section of transmission line including the shutter of the present invention, and FIGURE 5 is a plot of isolation in db vs. frequency for the shutter of the present invention in the closed position.

Referring now to FIGURE 1, there is shown a typical receiver circuit including the shutter of the present invention. More specifically, an antenna 1 receives the microwave signal to be detected. The signal received by the antenna 1 is fed via the intermediary of the pre-TR and TR tube, 2 and 3 respectively, to the shutter 4. The output of the shutter 4 is fed to the input of the microwave receiver 5 wherein the microwave signals are detected. When the receiver 5 is in operation, the shutter 4 is in the open position such as to pass signals received by the antenna 1, and passed by the pre-TR and TR tube, directly to the receiver without substantial attenuation of the signal. However, when the receiver is inactivated, the shutter 4 is in the closed position serving to reflect back to the antenna 1 signals that may be received by the antenna and passed by the pre-TR and TR tubes. Typically, large amplitude input signals received by the antenna 1, such signals being, for example, those transmitted by very nearby radars, will cause both the pre-TR and TR tubes to fire such that most of the energy of the signal is reflected back to the antenna 1. However, there will be a leakage signal typically on the order of 30–40 watts which will pass to the shutter 4. The shutter 4 should be designed to present at least 20 db isolation in the closed position, such that the signal amplitude which is passed by the shutter in the closed position to the receiver is on the order of 300 mw. or less. A substantially larger signal could serve to burn out the crystals in the microwave receiver 5.

Referring now to FIGURES 2 and 3, there is shown the microwave shutter of the present invention. More specifically, the shutter 4 includes a section of rectangular waveguide 6 provided with a pair of waveguide flanges 7 at opposite ends thereof for connecting it in circuit with the remaining position of the microwave circuit.

A selectively retractable conductive rod 9 forms a waveguide shutter element and extends, in the closed position, into the guide 6 from the top broad wall 11 to the opposed broad wall 12 across the height of the guide 6. A dielectric plug 13 as of Teflon is carried at the inner end of the rod 9 and serves to make physical contact, in the closed position, with the broad wall 12. The shutter rod 9 extends, in the closed position, out of the guide 6 through an aperture in the top wall 11 defined by the opening in the end of a sleeve of 14 which receives the rod 9 axially translatable therewithin. The sleeve 14 is fixedly secured in an electrical contacting relation with the top wall 11 of the guide 6. The sleeve 14 is made of a good electrical conducting material which is non-magnetic such as, for example 90–10 gold-plated bronze. The outer end of the sleeve 14 is closed by a plug 15 of magnetic material as of iron. A compression spring 16 is carried internally of and at the outer end of the sleeve 14 and at its inner end rides on a shoulder 17 of the shutter rod 9 for holding the rod 9 in the closed position.

An electrical solenoid 18 is wound around the sleeve 14. The solenoid 18 is surrounded by a cylindrical magnetic yoke 19 as of iron. The yoke is provided at its ends with a pair of magnetic pole pieces. One of the poles is the magnetic plug 15 and the other is a magnetic washer 21 disposed adjacent the broad wall 11 of the guide 6.

The waveguide shutter rod 9 is made of a magnetic material such as soft iron and forms the moveable armature of the solenoid 18. The rod 9 is plated with a conductive coating such as nickel. A copper disc 22 is positioned in and at the outer end of the sleeve 14 between the spring 16 and the end pole piece 15 in order to help break the magnetic attraction between the pole 15 and the armature shutter rod 9 when the rod 9 is in the fully retracted position and the solenoid is deenergized. A pair of leads 23 and 24 are connected to suitable terminals 25 and 26 and make connections to the ends of the solenoid 18 for energizing same.

The shutter rod 9 is dimensioned to present an inductance L which in series resonant with the capacitance C between the end of the rod and the broad C wall 12 as taken through the dielectric plug 13. The Q of the resonance is adjusted to cover the passband of the radar receiver. In this manner, when the shutter rod 9 is in the closed position the shutter rod looks like a short circuit serving to reflect wave energy traveling toward the shutter 4 from the antenna 1.

In operation, the solenoid 18 is energized producing a magnetic field between the poles 15 and 21 causing the magnetic shutter rod 9 to be drawn into the solenoid and thereby fully retracted from the waveguide 6 to thereby open the shutter. To close the shutter 4, the current to the solenoid 18 is interrupted causing the spring 16 to force the shorting shutter rod 9 across the waveguide 6. The spring 16 also holds the rod 9 under vibration and shock against the opposing wall 12 of the guide 6 to maintain the short.

The shutter rod 9 is dimensioned in length such that the portion of the rod 9 which extends into the sleeve 14, in the closed position, is approximately $N\lambda/4$ wavelengths long to reflect from its open circuited end within the sleeve 14 a short circuit at the junction of the rod 9 and the upper waveguide wall 11, whereby currents flowing in the waveguide wall 11 will be shorted to the rod 9 and can flow through the series resonance portion of the rod 9 extending into the guide 6 to effectively reflect practically all of the energy travelling in the guide 11 at the series resonance frequency of the rod 9. FIGURE 5 shows a graph of isolation versus frequency for the typical shutter of the present invention. From this plot, it is seen that the shutter element 9 provides, in the closed position, on the order of 40 db of attenuation over a relatively wide band of frequencies, thereby very effectively isolating the receiver from the antenna 1.

In the open position of the shutter 4, the rod is fully retracted within the sleeve 14. In the fully retracted position, the outer end of the rod 9 comes very close to the end of the sleeve 14, and the sleeve and rod form a half wavelength choke providing an effective short circuit at the entrance to the sleeve 14, in the wall 11, whereby substantially no energy is reflected from the withdrawn shutter element 9. Therefore the insertion loss of the shutter, in open position, is substantially nil.

In a typical shutter designed for operation at a center frequency of 16.5 gigacycles, the shutter had the following dimensions:

The rod 9 had a length of 0.859" and a diameter of 0.088". The Teflon plug 13 had a length of 0.020" between the waveguide wall 12 and the end of the rod 9 when closed. Sleeve 14 had a length from the conductive disc 22 to its open end of 0.900". In this manner, when the rod 9 was fully inserted within the waveguide 6, that portion of the rod retained within the sleeve 14 and forming a section of open circuit coaxial line therewith was approximately ¾ of a wavelength long to reflect a short circuit at the upper wall 11. Also, the recessed portion of the rod 9 which receives the spring 16 therearound was approximately ¼ wavelength long to facilitate impedance matching the open circuit discontinuity at the end of the rod 9 to a short circuit at the wall 11.

Since many changes can be made in the above construction and many apparently widely different embodiments of the invention can be made without departing from the scope thereof it is intended that all matter contained in the above description or shown in the accompanying drawings shall be interpreted as illustrative and not in a limiting sense.

What is claimed is:

1. In a microwave shutter apparatus, means forming a waveguide having first and second mutually opposed conductor portions forming a waveguiding region of space therebetween, means forming a conductive rod insertable into said waveguiding region through said first conductor portion and into electrically non-contacting relation with said second conductor portion, a dielectric member disposed intermediate the inner end of said rod and said second conductor portion when said rod is inserted to prevent physical contact between said rod and said second conductor portion to form a capacitance between the electrically non-contacting end of said rod and said second conductor portion, said rod being dimensioned to provide an inductance which is series resonated with said capacitance of said rod to said second conductor portion through said dielectric member at a certain resonant frequency within the passband of said waveguide, said non-contacting rod when inserted in said waveguide forming a series resonant element in shunt across said waveguide for reflecting wave energy back along said waveguide which is incident upon said resonant rod and which is within a certain passband of frequencies centered at the resonant frequency of said rod, and means for selectively retracting said series resonant rod for passage of wave energy through said waveguide which is within the certain passband of frequencies.

2. The apparatus according to claim 1 wherein said dielectric member is affixed on the inner end of said rod for making physical contact between the rod and the adjacent conductive member portion of said waveguide.

3. The apparatus according to claim 2 wherein said means for selectively retracting said rod includes a solenoid coaxially disposed of said rod, and said rod includes at least a portion thereof made of a magnetic material for being retracted by magnetic forces into said solenoid upon energization of said solenoid.

4. The apparatus according to claim 3 including, a spring axially disposed of said rod for urging same into said waveguide.

5. The apparatus according to claim 3 including a hollow conductor coaxially disposed of said rod, externally of said waveguiding region of space, into which said rod is retracted upon energization of said solenoid, said hollow conductor being closed at its outer end and having a length dimension to form a choke which presents an effective short circuit between said waveguiding conductor portion and said rod at the point said rod enters said waveguide.

6. The apparatus according to claim 3, including a hollow conductor coaxially disposed of said rod, externally of said waveguide into which said rod is retracted upon energization of said solenoid, said rod being dimensioned in length such that in its closed position, fully extending into said guide, the portion of said rod which is axially coextensive with said hollow conductor forms a choke which presents an effective short circuit between the waveguiding conductor portion and said rod at the point said rod enters said waveguide.

7. The apparatus according to claim 2 wherein said rod is nickel plated iron and said dielectric member is a yieldable plastic material.

8. The apparatus according to claim 7 wherein said dielectric member is of tetrafluoroethylene resin.

References Cited

UNITED STATES PATENTS 2,530,979  11/1950  Matland et al. _____ 333—98
3,164,792  1/1965  Georgiev et al.

HERMAN KARL SAALBACH, *Primary Examiner.*

LOUIS ALLAHUT, *Assistant Examiner.*